United States Patent
Kurakake et al.

[11] Patent Number: 6,078,005
[45] Date of Patent: Jun. 20, 2000

[54] APPARATUS FOR EDITING AND REPRODUCING VISUAL EVENTS ALONG MUSICAL EVENTS

[75] Inventors: Yasushi Kurakake; Toshiyukii Ito, both of Hamamatsu, Japan

[73] Assignee: Yahama Corporation, Hamamatsu, Japan

[21] Appl. No.: 09/316,807

[22] Filed: May 21, 1999

[30] Foreign Application Priority Data

May 28, 1998 [JP] Japan .................................. 10-146922

[51] Int. Cl.[7] ....................................................... G10C 3/12
[52] U.S. Cl. .......................................... 84/477 R; 84/609
[58] Field of Search ......................... 84/609, 634, 477 R; 434/307 A

[56] References Cited

U.S. PATENT DOCUMENTS

| | | | |
|---|---|---|---|
| 5,335,073 | 8/1994 | Yamamoto | 434/307 A |
| 5,569,869 | 10/1996 | Sone | 84/609 |
| 5,803,747 | 9/1998 | Sone et al. | |
| 5,827,990 | 10/1998 | Fujita | 434/307 A X |
| 5,863,206 | 1/1999 | Narusawa et al. | 84/477 R X |
| 5,898,119 | 4/1999 | Tseng et al. | 434/307 A X |
| 5,900,566 | 5/1999 | Mino et al. | 434/307 A X |
| 5,929,359 | 7/1999 | Sone et al. | 84/477 R X |

*Primary Examiner*—Jeffrey Donels
*Attorney, Agent, or Firm*—Graham & James LLP

[57] ABSTRACT

A music apparatus is constructed for reproducing multimedia events including musical events and visual events arranged in synchronization to the musical events. In the music apparatus, a storage device provides a data structure composed of music information which determines a sequence of the musical events, image progression information which determines a sequence of the visual events in synchronization to the sequence of the musical events, and event information which represents the visual events involved in the image progression information. A tone generator processes the music information to generate musical tones in correspondence to the sequence of the musical events. An image synthesizer operates in synchronization to the tone generator for sequentially processing the event information according to the image progression information to synthesize images in correspondence to the sequence of the visual events. The synthesized images are displayed along the progression of the musical tones to thereby reproduce the multimedia events.

14 Claims, 9 Drawing Sheets

APPARATUS FOR EDITING AND REPRODUCING VISUAL EVENTS ALONG MUSICAL EVENTS

BACKGROUND OF THE INVENTION

1. Field of the Invention

The present invention generally relates to a multimedia information editing apparatus and a multimedia information reproducing apparatus that is capable of performing a piece of music and reproducing image information in response to the progression of that piece of music, a recording medium recording a multimedia information reproducing program, and a recording medium recording a sequence data structure for reproducing image information in response to the progression of a piece of music to be performed.

2. Description of Related Art

Technologies are known in which image information and music tone information are reproduced in synchronization to each other on a personal computer for example. One of these technologies is a software program by which a user-original digital photo album is edited based on photographs taken by the user by combining images, texts, and sounds. This software allows the user to combine images, texts, and sounds on a personal computer based on photographs taken by the user and to reproduce the combined results in a slide-show manner. This software also allows the user to attach desired background music to one or more of desired photographs. Further, this software allows the user to add visual effects such as wipe, fade-in, and fade-out when turning album pages, thereby imparting a kind of screen effects such as page turning.

However, the main purpose of the above-mentioned conventional technology is directed to the image reproduction, and therefore it cannot easily create sequence information determining image progression along the progression of music such as a video clip. Besides, the above-mentioned conventional software creates image progression information by arbitrarily arranging prepared display screen background images and screen effects (such as fade-in and fade-out) for use at connecting between successive scenes of photographs. Consequently, it is difficult for novice users to create the image progression information so that a series of photographs is combined to an effect flow smoothly. Moreover, the above-mentioned conventional technology requires, at editing the image progression information, to do tedious works such as replacement and deletion of each photograph or effect to be edited, thereby making the editing jobs burdensome.

SUMMARY OF THE INVENTION

It is therefore an object of the present invention to provide a multimedia information editing apparatus that overcomes the above-mentioned inconveniences to facilitate the creation of sequence information determining image progression along the progression of music by mainly placing emphasis on the progression of music, and a recording medium recording a multimedia information reproducing program.

It is another object of the present invention to provide a multimedia information reproducing apparatus capable of easily editing image information and effects to be reproduced in synchronization to the progression of music, and a recording medium recording a multimedia information reproducing program.

It is still another object of the present invention to provide a recording medium recording sequence information having a novel data structure that allows reproduction of an image in synchronization to the progression of music to be performed.

According to the invention, an editing apparatus is constructed for editing multimedia events including musical events and visual events arranged in synchronization to the musical events. In the inventive apparatus, a storage device stores music information which can be processed to provide a progression of the musical events, image progression information which can be created to determine a sequence of the visual events, and visual event information which represents the visual events to be sequentially reproduced according to the image progression information, the sequence of the visual events being composed of a sub sequence of primary visual events representative of scenes and another sub sequence of secondary visual events representative of at least visual effects applied to the scenes and visual changes used to connect the scenes. A helper device provides a plurality of scenarios, each of which determines a sub sequence of secondary visual events. A selector device is operable when the image progression information is created for allotting one of the scenarios to the music information such that the sub sequence of the secondary visual events determined by the allotted scenario is combined with the sub sequence of the primary visual events contained in the image progression information to constitute the sequence of the visual events. Preferably, the storage device stores the music information and the image progression information, both of which adopt a common clock system for determining occurrence timings of the music events and the visual events in synchronization with each other. Preferably, the inventive apparatus further includes a device that can replace the music information of one song by new music information of another song while reserving the synchronization of the visual events to the musical events provided by the new music information. Preferably, the helper device provides each scenario determining a title event, which is a specific one of the secondary visual events and which is arranged at a top portion of the sub sequence of the secondary visual events, such that the title event is automatically integrated into a head of the sequence of the visual events when the sub sequence of the secondary visual events is combined with the sub sequence of the primary visual events.

According to the invention, a reproducing apparatus is constructed for reproducing multimedia events including musical events and visual events arranged in synchronization to the musical events. In the inventive apparatus, an information device provides music information which determines a sequence of the musical events, image progression information which determines a sequence of the visual events in synchronization to the sequence of the musical events, and event information which represents the visual events involved in the image progression information. A tone generator device processes the music information to generate musical tones in correspondence to the sequence of the musical events. An image synthesizer device operates in synchronization to the tone generator device for sequentially processing the event information according to the image progression information to synthesize images in correspondence to the sequence of the visual events. A display device displays the synthesized images along the progression of the musical tones to thereby reproduce the multimedia events. Preferably, the information device provides the music information and the image progression information, both of which adopt a common clock system for determining occurrence timings of the music events and the visual events in synchronization with each other. Preferably, the information device provides the image progression information containing data representing a time resolution of frames of the images corresponding to the sequence of the visual events, the image synthesizer device synthesizes the frames of the images according to the time resolution contained in the image progression information, and the display device successively displays the frames of the images at a refresh rate corresponding to the time resolution.

According to the invention, a computer readable medium is made for storing a data structure processed by a computer to reproduce multimedia events including musical events and visual events arranged in synchronization to the musical events. The data structure is composed of music information, image progression information and event information. The music information is arranged to determine a sequence of the musical events, and is processed by the computer to generate musical tones in correspondence to the sequence of the musical events. The image progression information is arranged to determine a sequence of the visual events in synchronization to the sequence of the musical events, the image progression information containing event timing data determining an occurrence timing of each visual event and event specification data specifying each visual event. The event information directly or indirectly represents an image of each visual event, and is sequentially processed by the computer according to the event specification data and the event timing data to synthesize images in correspondence to the sequence of the visual events along the progression of the musical tones.

According to the invention, a computer readable medium is made for use in a computer having a central processor. The medium contains program instructions executable by the central processor for causing the computer to perform a process of editing multimedia events including musical events and visual events arranged in synchronization to the musical events. The process comprises the steps of providing music information which can be processed to produce a progression of the musical events, image progression information which can be created to determine a sequence of the visual events, and visual event information which represents the visual events to be sequentially reproduced according to the image progression information, the sequence of the visual events being composed of a sub sequence of primary visual events representative of scenes and another sub sequence of secondary visual events representative of at least visual effects applied to the scenes and visual changes used to connect the scenes, providing a plurality of scenarios, each of which determines a sub sequence of secondary visual events, and allotting one of the scenarios to the music information when the image progression information is created such that the sub sequence of the secondary visual events determined by the allotted scenario is combined with the sub sequence of the primary visual events contained in the image progression information to constitute the sequence of the visual events.

According to the invention, a computer readable medium is made for use in a computer having a central processor. The medium contains program instructions executable by the central processor for causing the computer to perform a process of reproducing multimedia events including musical events and visual events arranged in synchronization to the musical events. The process comprises the steps of providing music information which determines a sequence of the musical events, image progression information which determines a sequence of the visual events in synchronization to the sequence of the musical events, and event information which represents the visual events involved in the image progression information, processing the music information to generate musical tones in correspondence to the sequence of the musical events, sequentially processing the event information according to the image progression information to synthesize images in correspondence to the sequence of the visual events, and displaying the synthesized images along the progression of the musical tones to thereby reproduce the multimedia events.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings. It should be noted that a multimedia information editing apparatus and a multimedia information reproducing apparatus according to the invention may be implemented either as dedicated music apparatuses, or as processing apparatuses based on hardware of a general-purpose personal computer and software of multimedia information editing and reproducing programs executed on the personal computer. The following describes those implemented by the personal computer.

Figure 1:
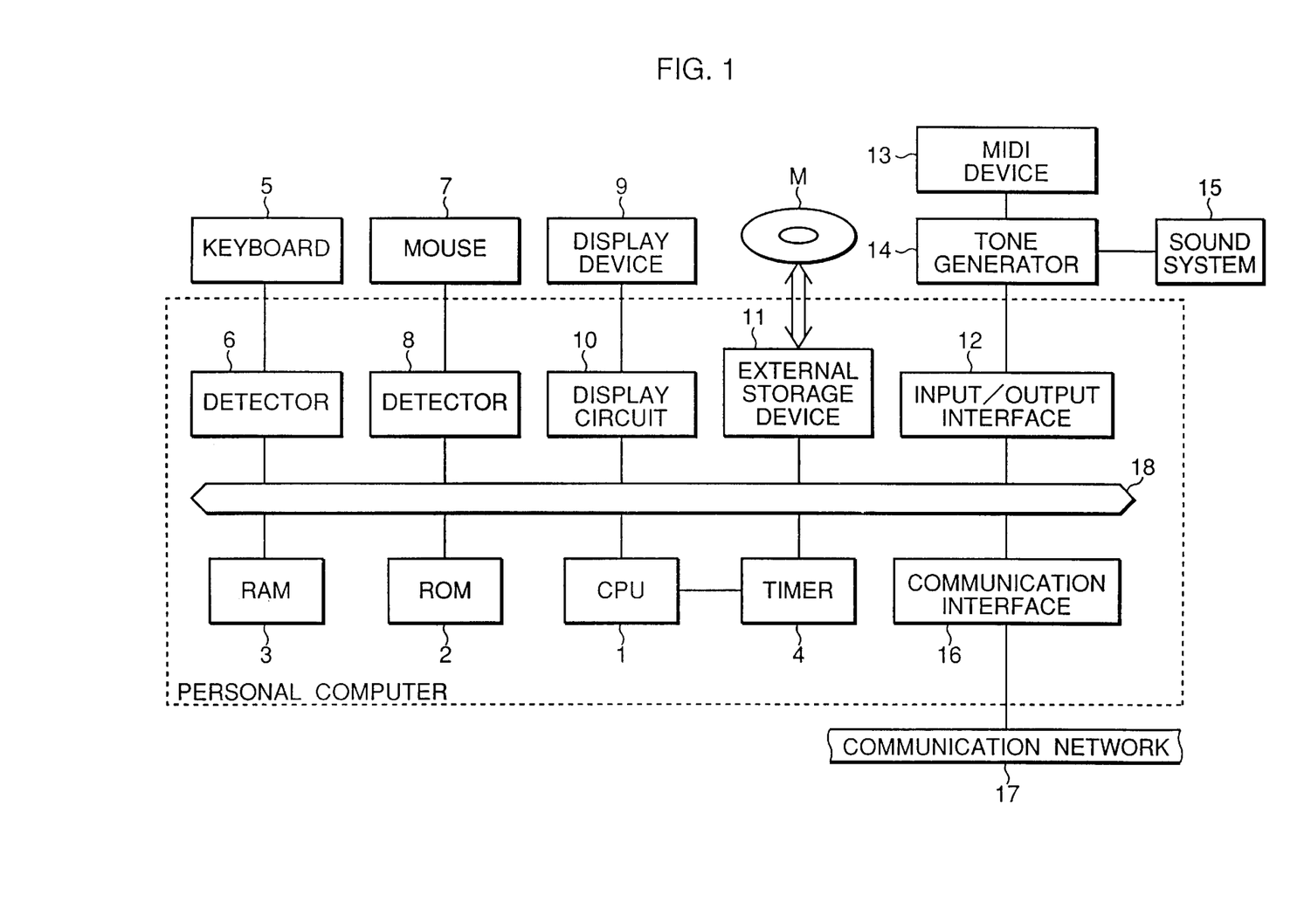
FIG. 1 is a block diagram illustrating an example of the hardware configuration of a multimedia information editing apparatus and a multimedia information reproducing apparatus practiced as one preferred embodiment of the invention.

Now, referring to FIG. 1, reference numeral 1 denotes a CPU (Central Processing Unit) for controlling the entire multimedia information editing and reproducing apparatuses. Reference numeral 2 denotes a ROM (Read Only Memory) for storing control programs and various control information to be executed by the CPU. Reference numeral 3 denotes a RAM (Random Access Memory) for loading programs and various control information and for use as a temporary storage area (or a buffer). Reference numeral 4 denotes a timer for providing the CPU 1 with a current time and timings for timer interrupt handling. It should be noted that the multimedia information editing and reproducing programs associated with the invention may be stored in either the ROM 2 or the RAM 3. When loading into the RAM 3, these programs are read from an external storage device 11 or downloaded through a communication interface 16 from a server computer connected to a communication network 17.

Reference numeral 5 denotes a keyboard through which text data and control data are inputted. Reference numeral 6 denotes a detector for connecting the keyboard 5 to this system. Reference numeral 7 denotes a pointing device such as a mouse. Reference numeral 8 denotes another detector for connecting the pointing device 7 to this system. Reference numeral 9 denotes a display device. Reference numeral 10 denotes a display circuit for controlling the displaying of an image onto the display device 9.

Reference numeral 11 denotes the external storage device, which may be a hard disk drive, a CD (Compact Disc)ROM drive, a FD (Floppy Disc) drive, an MO (Magneto-Optical) drive, a DVD (Digital Video Disc) drive, a Zip drive, or a Jazz drive, for example. Reference numeral 12 denotes an input/output interface for connecting a tone generator 14 to this system. Reference numeral 13 denotes a MIDI (Musical Instrument Digital Interface) device. Reference numeral 15 denotes a sound system connected to the tone generator 14. The communication network 17 is a telephone line, the Internet, or a LAN (Local Area Network).

Before describing the multimedia information editing and reproducing programs according to the invention, various data to be held in the RAM 3 at execution of these programs will be described below with reference to FIGS. 2(*a*) through 2(*e*).

FIG. 2(*a*) illustrates effect information in which image information (moving picture) for use as the background effect at image reproduction is stored in an ordinary moving picture format such as AVI (Audio Video Interleave). This effect information includes visual effects applied to picture and text. For example, various pieces of effect information such as a snow-falling effect are stored in a predetermined area of the RAM 3.

FIG. 2(*b*) illustrates scene change information, which is moving picture information for use at a joint between two scenes to effectively link them. For example, this scene change information is used to impart visual effects such as fading a preceding scene into a succeeding scene and such as shifting scenes like turning pages. The scene change information is also stored in plural types in a predetermined area of the RAM 3.

FIG. 2(*c*) illustrates picture information that provides the main image information or substances in each scene. The picture information may be either of moving picture or still picture. The picture information is also stored in plural types in a predetermined area of the RAM 3 in a general-purpose format such as GIF (Graphics Interchange Format), JPEG (Joint Photographic Experts Group), and AVI. If required, the user can add new picture information to that predetermined area.

FIG. 2(*d*) illustrates music data, for example, created based on SMF (Standard MIDI File). This music data is also stored in plural types in a predetermined area of the RAM 3. If required, the user can add new music data to that predetermined area.

FIG. 2(*e*) illustrates scenario information for setting image progression. As shown, one item of scenario information is composed of three types of information; scenario number, title information, and progression information. Scenario number is an identification code attached to each scenario item. Title information is a kind of image progression information associated with a title image at the start of image reproduction. Progression information comprises information representative of occurrence patterns of picture effect, scene change, text, and scene dividing position. The image progression information for each scene is sequentially stored in the progression information. It should be noted that the progression information does not include data indicative of time domain.

The above-mentioned scenario information is prepared in plural types in the RAM 3, such as video clips (pops and techno for example) and movies (8-mm and theater for example). In case of the scenario information for 8-mm movie for example, its title information includes image progression information numbered 3, 2, 1 in this order. The image progression information for each scene is adapted to have effects like 8-mm movie. Thus, the preparation of typical scenario information allow the user to simply select desired scenario, thereby easily creating effective image progression information based on the selected scenario information. For example, the user selects a piece of music to be performed, determines image data to be displayed at scene connection and in each scene, and then selects the above-mentioned scenario information, thereby automatically setting visual effects for the title screen and following scenes and thereby automatically setting the scene changes.

Referring back to FIG. 1, the inventive editing apparatus is constructed for editing multimedia events including musical events and visual events arranged in synchronization to the musical events. In the inventive editing apparatus, the external storage device 11 stores a sequence data structure composed of music information which can be processed to provide a progression of the musical events, image progression information which can be created to determine a sequence of the visual events, and visual event information which represents the visual events to be sequentially reproduced according to the image progression information, the sequence of the visual events being composed of a sub sequence of primary visual events representative of scenes and another sub sequence of secondary visual events representative of at least visual effects applied to the scenes and visual changes used to connect the scenes. A helper device implemented by the CPU 1 provides a plurality of scenarios, each of which determines a sub sequence of secondary visual events. A selector device composed of the keyboard 5 and the mouse tool 7 is operable when the image progression information is created for allotting one of the scenarios to the music information such that the sub sequence of the secondary visual events determined by the allotted scenario is combined with the sub sequence of the primary visual events contained in the image progression information to constitute the sequence of the visual events. Preferably, the storage device 11 stores the music information and the image progression information, both of which adopt a common clock system such as MIDI clock system for determining occurrence timings of the music events and the visual events in synchronization with each other. Preferably, the inventive editing apparatus further includes an input device such as the keyboard 5 that can replace the music information of one song by new music information of another song while reserving the synchronization of the visual events to the musical events provided by the new music information. Preferably, the helper device provides each scenario determining a title event, which is a specific one of the secondary visual events and which is arranged at a top portion of the sub sequence of the secondary visual events, such that the title event is automatically integrated into a head of the sequence of the visual events when the sub sequence of the secondary visual events is combined with the sub sequence of the primary visual events. Details of the operation will be described late.

Figure 3A:
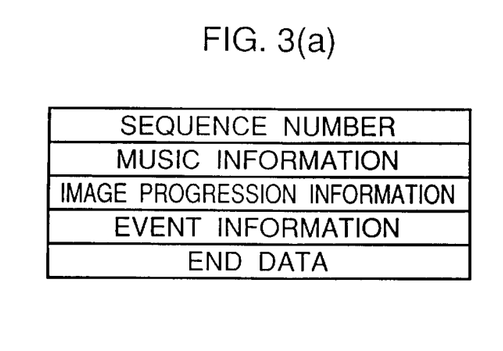
FIG. 3(a) through FIG. 3(c) are diagrams illustrating sequence information structured according to the invention.
Figure 3B:
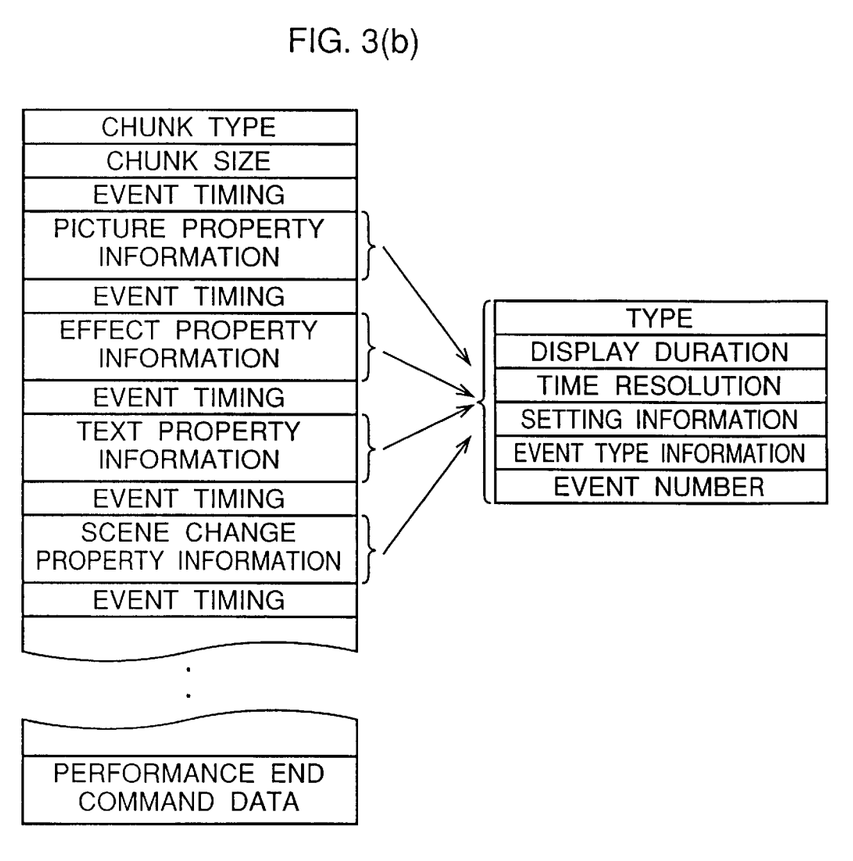
Figure 3C:
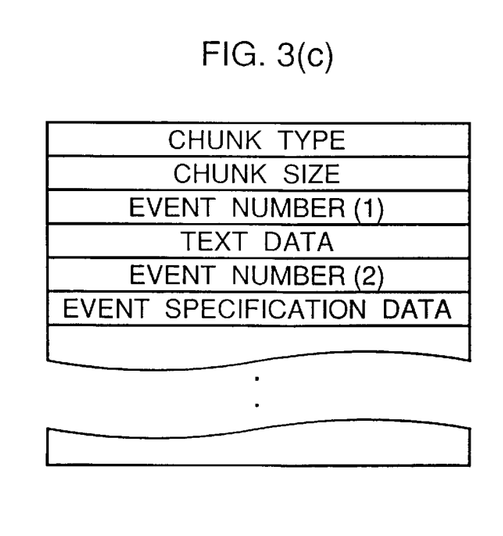

The following describes, with reference to FIGS. 3(*a*) through 3(*c*), the data structure of the sequence information for reproducing the multimedia information to be created or edited by use of the multimedia information editing and reproducing programs according to the invention.

FIG. 3(a) illustrates an overall structure of one piece of sequence information. As shown, one piece of sequence information comprises a sequence number for identifying this sequence information, music information corresponding to a piece of music to be used in this sequence information, image progression information in which the information associated with each type of image events to be generated along performance of the piece of music is stored in a time sequence of generation, event information representative of the image events, and end data indicative of the end of this sequence information. As described, the present embodiment uses a sequence number for identifying the above-mentioned sequence information. However, other information such as the name of the sequence information in question may be used instead. For the above-mentioned music information, music specification data for specifying music data in question or for specifying music data itself may be used. It should be noted that the music specification data is used in the present embodiment for the sake of description.

FIG. 3(b) illustrates the contents of the image progression information. As shown, the image progression information has, in its head portion, chunk type data indicating that this information block is image progression information and chunk size data indicative of the size of this image progression information block. These items of data are followed by event sequence data comprising event timing data for specifying the timing of occurrence of each image event, and property information associated with that image event, namely various items of image event property information such as picture property information, effect property information, text property data, and scene change property information. These items of property information are stored in the order of event occurrence. Because the present embodiment is mainly based on music progression for its operation, the above-mentioned event timing data is given in units of timing information corresponding to music progression, a MIDI clock for example. Performance end indication data indicates the end of performance of music tone information at the end of an image display operation.

The above-mentioned picture property information, effect property information, text property information, and scene change property information have each an identical data structure. As shown, each of these items of property information has type data indicative of the type (picture, effect, text, or scene change) of that property information, display duration data indicative of a time length of a scene in question, time resolution data indicative of the reproduction time resolution of an image to be reproduced, setting information indicative of the settings of display size and display position of each image or text and the setting of font, event type information indicative whether that event is a still picture, moving picture, or a text, and event number data for specifying a corresponding event contained in the event information shown in FIG. 3(a).

FIG. 3(c) illustrates the contents of event information that follows the above-mentioned image progression information. The event information is stored at a recording area for the image information corresponding to the event number stored in each of the above-mentioned various property information. As shown, the event information has, in its head portion, chunk type data indicating that this information block is event information and chunk size data indicative of the size of this event information block, followed by event specification data for specifying an event corresponding to an event number. If an object event is text, the text data itself is recorded as the event specification data. If the event is a still picture or moving picture, the event specification data is indicative of an area at which the substance of image data is recorded.

According to the invention, a recording medium M (FIG. 1) is made for storing a sequence data structure processed by the inventive apparatus to reproduce multimedia events including musical events and visual events arranged in synchronization to the musical events. The sequence data structure is composed of music information, image progression information and event information. The music information is arranged to determine a sequence of the musical events, and is processed by the CPU 1 to generate musical tones in correspondence to the sequence of the musical events. The image progression information is arranged to determine a sequence of the visual events in synchronization to the sequence of the musical events, the image progression information containing event timing data determining an occurrence timing of each visual event and event specification data of event property data specifying each visual event. The event information directly or indirectly represents an image of each visual event, and is sequentially processed by the CPU 1 according to the event property data and the event timing data to synthesize images in correspondence to the sequence of the visual events along the progression of the musical tones.

According to the sequence information of the present invention having the above-mentioned data structure, the event timing information indicative of the occurrence timing of an image event is the timing information corresponding to the progression of music. Consequently, the image information can be reproduced in response to the progression of music performance. Since the event specification data is not written directly in the image progression information, the image data of the indirect recording form using the event specification data and the image data of the direct recording form not using the event specification date can be exchanged simply by rewriting the above-mentioned event information area.

Figure 4:
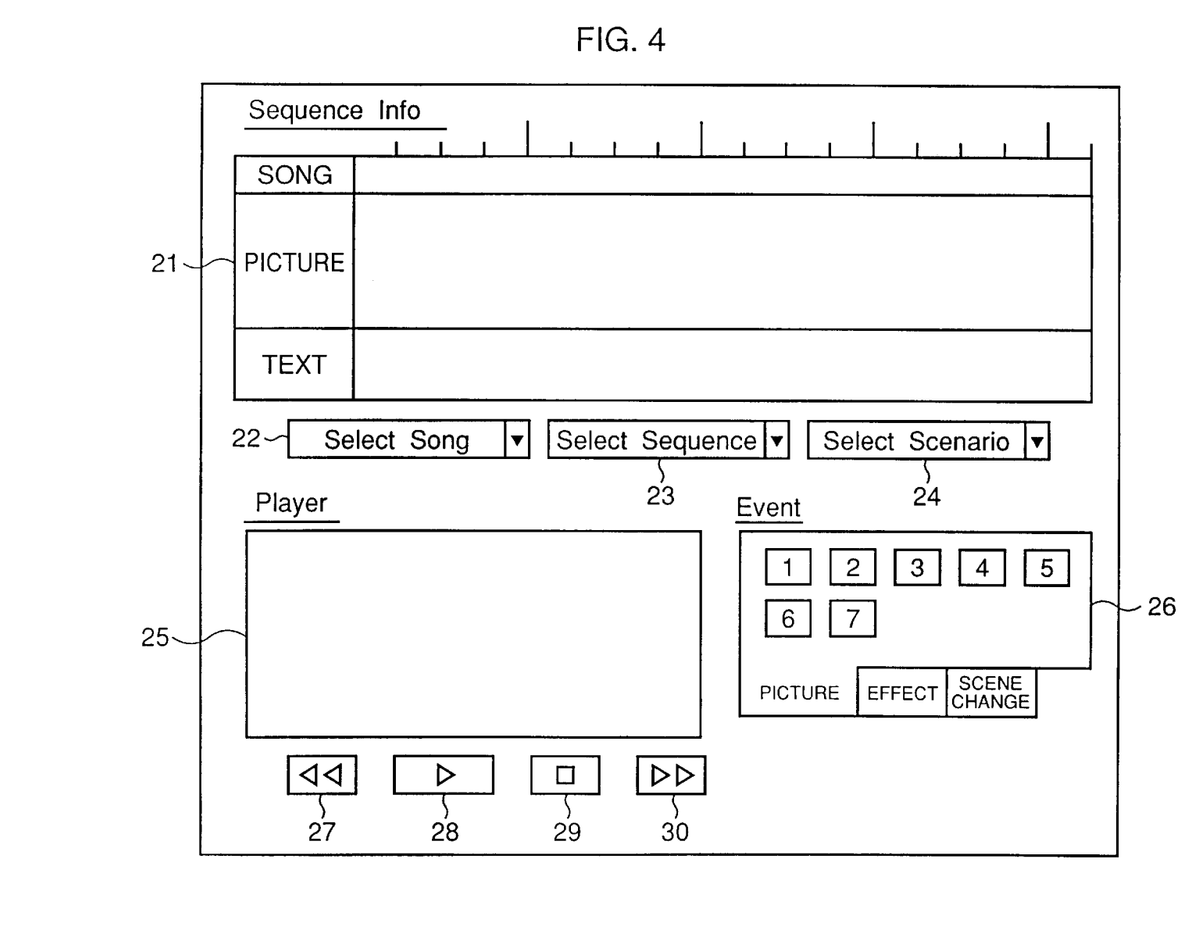
FIG. 4 is a diagram illustrating an initial screen displayed on of the embodiment shown in FIG. 1.

FIG. 4 illustrates an initial screen to be displayed on the display device 9 when the multimedia information editing and reproducing programs according to the invention are executed on the personal computer shown in FIG. 1. Referring to FIG. 4, reference numeral 21 denotes a sequence information (Sequence Info) display area. In the sequence information display area 21, the horizontal axis represents a time axis calibrated according to music bar positions for example. Below the time axis, three areas are arranged; a song area (SONG) for displaying music data, a picture area (PICTURE) for displaying image data, and a text area (TEXT) for display text data. Thus, the sequence information display area 21 collectively displays along the common time axis the sequence information, namely the multimedia information composed of the music data specified by music information, the image information, and the text information. Through the sequence information display area 21, the user creates new sequence information and edits existing sequence information.

Reference numeral 22 denotes a menu button for selecting music to be performed. The user pulls down the menu to select stored music data. Reference numeral 23 denotes a menu button for sequence selection, in which stored sequence information is selected. Reference numeral 24 denotes a menu button for scenario selection, in which stored scenario information is selected.

Reference numeral 25 denotes a play area, in which the image information is displayed at the time the sequence information currently displayed in the sequence information display area 21 is reproduced. Reference numeral 26 denotes an event area, in which information such as pictures, effects, and scene changes is selected at editing the sequence information. As shown, the event area 26 is composed of a tab dialog menu for example. This menu has tabs labeled PICTURE, EFFECT, and SCENE CHANGE. When one of these tabs is selected, the icons of the event corresponding to the selected tab are displayed. In the figure, PICTURE is selected and selectable picture icons 1 through 7 are displayed. The user selects the icon corresponding to a picture to be displayed in a desired scene in the sequence under edition or creation, and drags the selected icon to the target picture area, thereby allocating the desired picture to that scene.

Reference numerals 27 through 30 denote control buttons for controlling the reproduction of the scenes. The button 27 is for rewinding the scenes. The button 28 is for reproduction at normal speed. The button 29 is for stop. The button 30 is for fast feed. The user clicks these control buttons 27 through 30 with a pointing device such as a mouse to control the reproduction of the sequence of the scenes.

Figure 5:
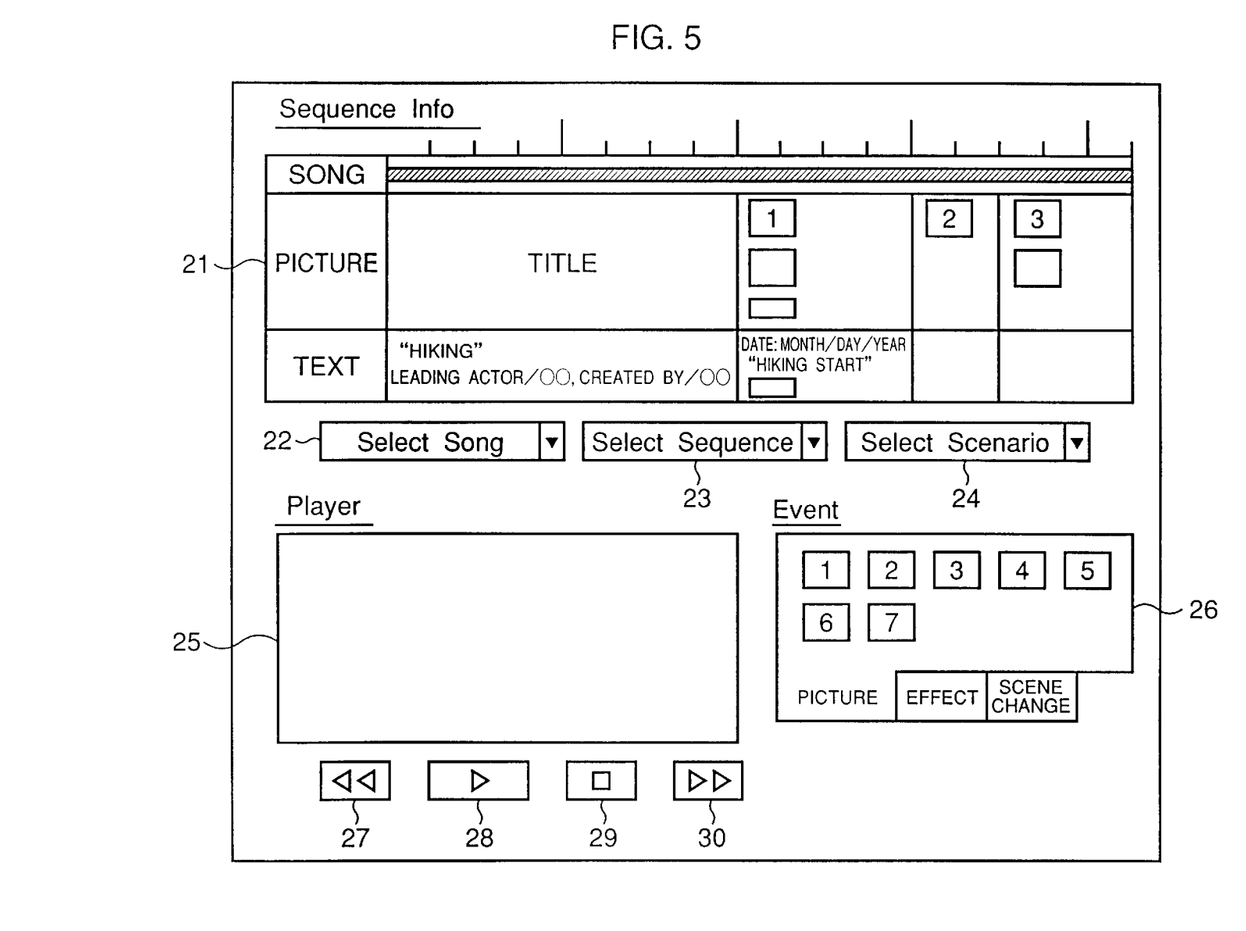
FIG. 5 is a diagram illustrating an operating screen of the embodiment shown in FIG. 1.

FIG. 5 illustrates a state of the above-mentioned display screen at the time when the sequence information has been read or created by the multimedia information editing and reproducing programs according to the invention. As shown, the song area in the above-mentioned sequence area 21 displays the selected music data. When the user selects this music data and selects a predetermined menu or double-clicks this music data, an editing window for the selected music data is opened, thereby allowing the user to edit the music data as with ordinary sequencer software.

The picture area and the text area are divided by a scene dividing line indicated by a vertical line as shown FIG. 5. Picture information and text information for each scene are displayed in each divided area. In the example shown, the text information in the title screen is HIKING, which is the name of the object sequence information, and the names of leading actor and creator are also displayed. The picture area of the first scene displays an icon for the picture indicated by "1" selected by the user, another icon indicative of a predetermined effect, and a further icon indicative of a scene change in this order vertically. The text area displays a date, a caption for describing the scene in question, and an icon for specifying an effect for the text (for example, display color or display manner). In the picture area indicated by "2" of the second scene, neither picture effect and scene change information nor text and text effect are set. In the third scene, only the picture indicated by "3" and an effect for the picture, for example background, are set and an icon indicative thereof is displayed. Likewise, the following scenes 4, 5, and so on display, icons of, the pictures, effect settings, and scene change settings corresponding to these scenes in the picture areas, and also display the text information and text effects to be displayed in these scenes in the text areas.

As shown, by selecting another piece of music by use of the menu button 22 while the sequence information under creation or edition is displayed, the user can change only the music to be performed without changing the image sequence to be displayed. In addition, by selecting a new scenario by use of the menu button 24, the user can totally change the visual effects and scene changes without affecting the music to be performed and without changing the image information to be displayed in each scene.

Further, by dragging icons of desired pictures, effects, and scene changes icons displayed in the event area to the area of a desired scene in the sequence information area, the user can create desired sequence information. When editing existing sequence information, the user can delete and copy, by use of an edit menu not shown, a picture and effect information shown in the above-mentioned sequence information area. In addition, by operating above-mentioned control buttons 27 through 30, the user can appropriately reproduce the sequence information under creation or editing, thereby executing a creating or editing work while checking the contents of the sequence data structure.

Figure 6:
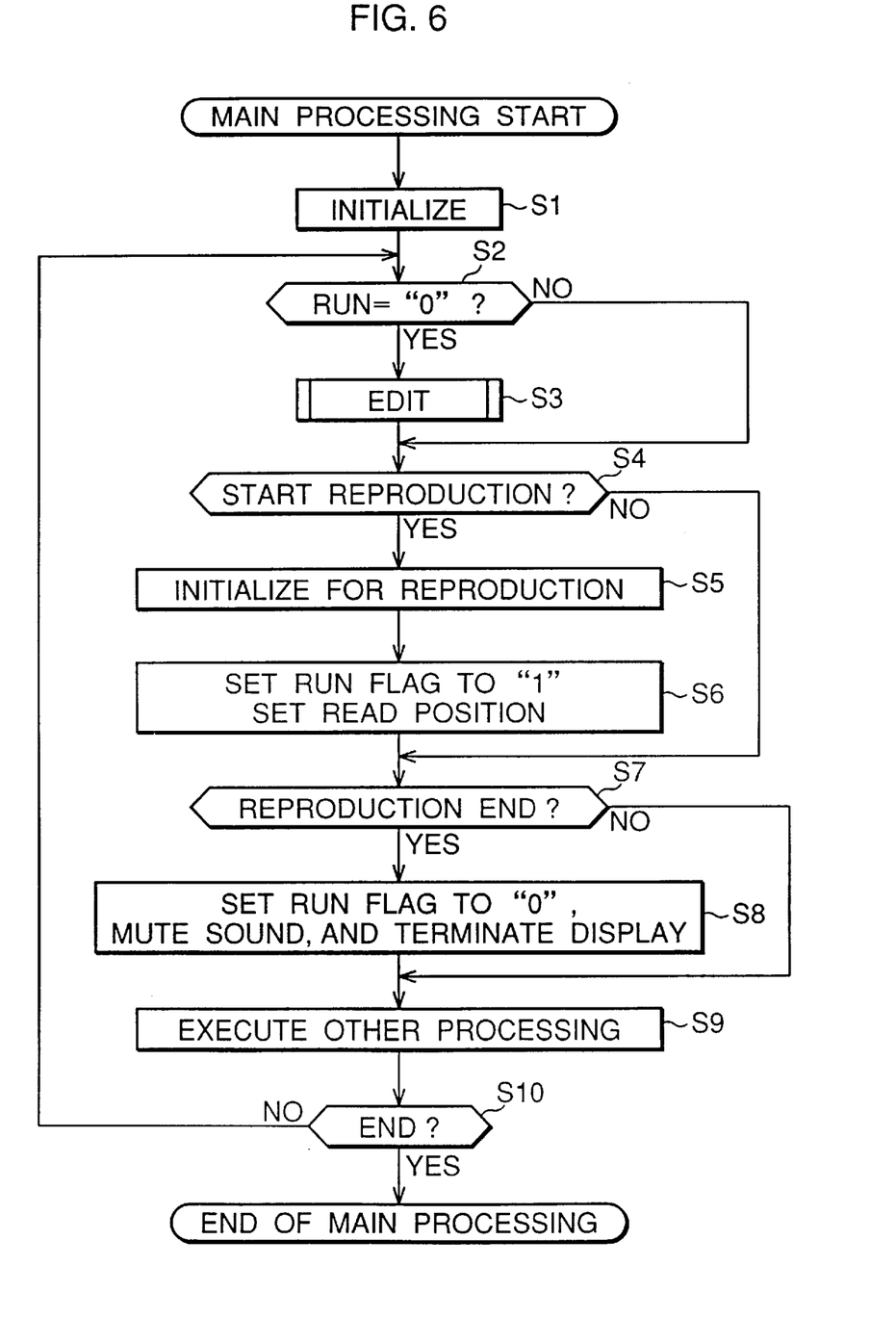
FIG. 6 is a flowchart for illustrating the main processing of the embodiment shown in FIG. 1.

The following describes operation flows of the present embodiment with reference to FIG. 6, which is a flowchart of the main processing to be executed by the present embodiment. It should be noted that the present embodiment is constituted to operate on the main processing shown in FIG. 6 and on three types of interrupt processing to be described later. The reproduction of created or edited sequence information is executed by these three types of interrupt processing.

When the main processing shown in FIG. 6 starts, an initializing operation is executed in step S1, thereby displaying an initial screen and clearing various flags and various data areas. In step S2, it is determined whether a RUN flag is "0" or not. The RUN flag indicates whether the music and image based on the sequence information is being reproduced or not. If the reproduction is going on, the RUN flag is "1"; if not, the RUN flag is "0". If the RUN flag is found "0" here, edit processing is executed in step S3. In the edit processing, the user can create or edit sequence information. Details of this edit processing will be described later with reference to FIG. 7.

If the reproduction based on the sequence information is going on and the RUN flag is "1" or the edit processing has come to an end, then in step S4, it is determined whether start of reproduction has been instructed or not. The start of reproduction is instructed from the menu not shown or by operating the reproduction button 28. When the start of reproduction is instructed, an initializing operation for reproduction is executed in step S5. In the reproduction initializing processing, flags, registers, and buffer areas for use in the reproduction of the music data and image information are initialized. In addition, a predetermined amount of the progression information is read from the top of the image progression information in the sequence information to be reproduced. A result of interpreting this progression information is stored in a temporary recording area allocated in the RAM 3. Then, in step S6, the RUN flag is set to "1" to set the read position in the temporary recording area for image reproduction.

When the processing of step S6 has come to an end or if the decision of step S4 is NO, then in step S7, it is determined whether an end of reproduction has been instructed or not. The end of reproduction is instructed from the menu not shown or by operating the reproduction end button 29. If the decision is YES, then in step S8, the RUN flag is reset to "0", and sound muting processing and image display end processing are executed.

If the decision of step S7 is NO or when the processing of step S8 has come to an end, then in step S9, other processing such as one for the operation of the fast feed button 30 or the rewind button 27 is executed. The fast feed or rewind processing can be implemented by executing the reproduction processing in forward or backward direction for each scene. Next, in step S10, it is determined whether an end of this multimedia information edit and reproduction processing has been instructed or not. If the decision is YES, this main processing is ended. If the decision is NO, then steps S2 through S10 are repeated.

Figure 7:
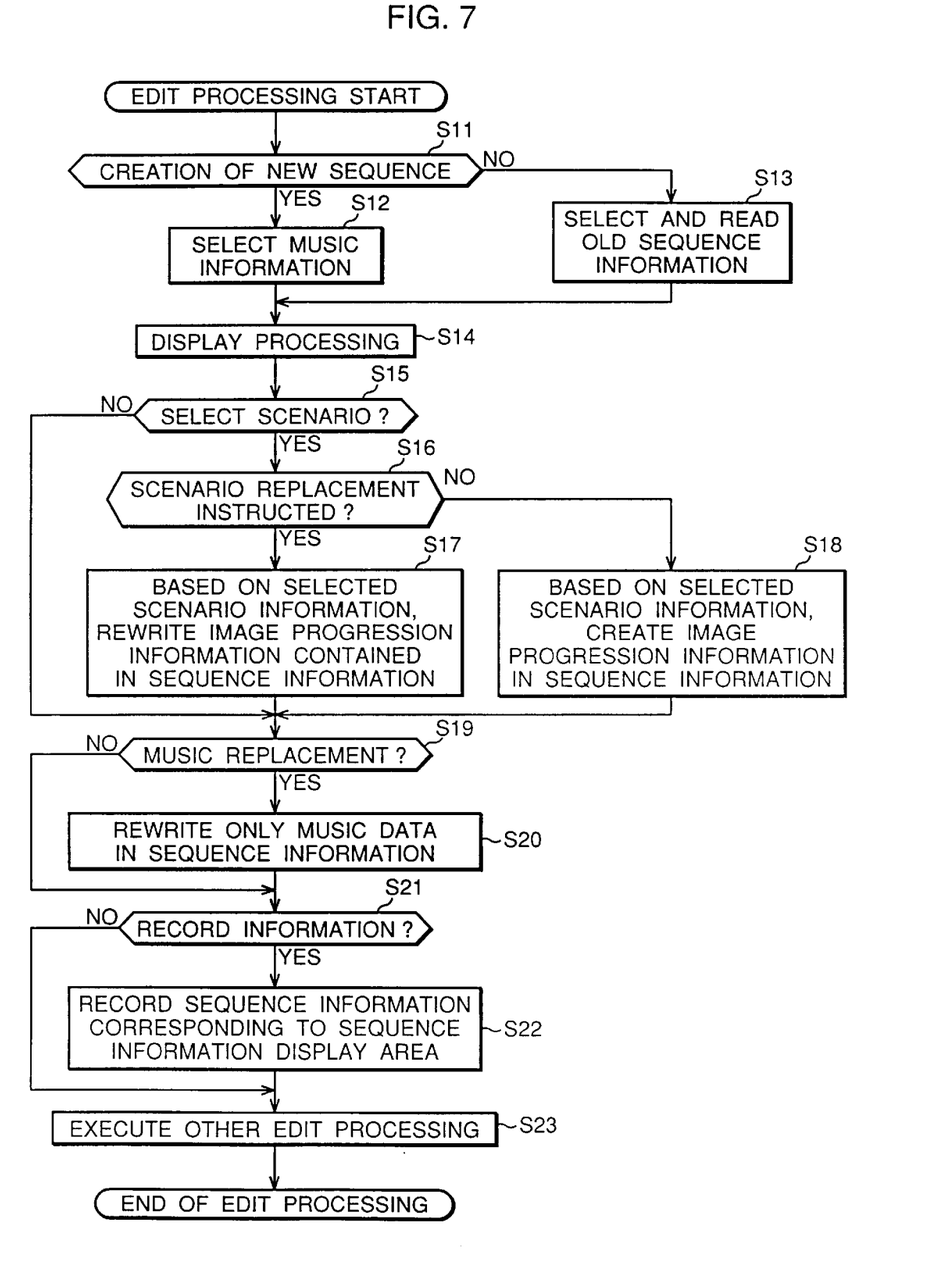
FIG. 7 is a flowchart for illustrating multimedia information editing processing.

FIG. 7 is a flowchart indicative of operations in the edit processing of step S3. When this edit processing starts, it is determined in step S11 whether the processing is for new creation of sequence information or for editing of existing sequence information. If the user newly selects a music piece by operating the menu button 22 shown in FIG. 4 for example, it is determined that the processing is commenced for the new creation, then music data is selected in step S12. Thus, the sequence data according to the invention is created by assigning image-associated information to music data. Consequently, in order to newly create sequence information, music data is first selected in step S12.

On the other hand, if the processing is commenced for editing existing sequence information as when the user has selected already created sequence information by operating the menu button 23 shown in FIG. 4 for example, the existing sequence information to be edited is selected and read in step S13. When the processing of step S12 or S13 has come to an end, display processing is executed in step S14. Consequently, for the processing of step S12, the selected music data is displayed in the song area of the initial screen shown in FIG. 4. For the processing of step S13, the display screen shown in FIG. 5 appears.

Then, in step S15, it is determined whether a scenario select operation has been executed or not. The scenario select operation is executed by operating the menu button 24. When the menu button 24 is clicked with the pointing device, scenario information (refer to FIG. 2(e)) stored in the RAM 3 is displayed in the form of pull-down menu for example. Then, the user selects desired scenario information.

When the scenario select operation has been executed, it is determined in step S16 whether the scenario selection is conducted for a scenario replacement or for a scenario select operation at creation of new sequence information. If a scenario is already set in the existing sequence information, it is determined that this scenario selection is for a scenario replacement instruction. Then, in step S17, based on the selected scenario information, the image progression information in the currently edited sequence information is rewritten. Namely, the property information associated with a title, effects, and scene changes in the image progression information is collectively rewritten to the property information equivalent to the selected scenario information. It should be noted here that the selected music data and the picture arranged in each scene are not affected at all. If, at the scenario replacement, the information associated with effects and scene changes is not included in the image progression information, no rewriting is executed. Thus, the information associated with a title, effects, and scene changes can be replaced in one set. For example, by changing the preset scenario information from pops to jazz, the title information, the visual effects, and the scene change modes are altered totally, thereby displaying an image having totally different atmospherics.

On the other hand, if the above-mentioned scenario selection is executed at creation of new sequence information, the decision of step S16 is NO, and the processing of step S18 is executed. In step S18, based on the selected scenario information, the image progression information is nearly constructed in the sequence information under creation. Namely, based on the progression information included in the selected scenario information, the image progression information associated with the title, visual effects, and scene change modes is automatically created. It should be noted that, if the substance pictures have already been arranged, the arrangement is left unchanged.

If the decision in step S15 is NO or when the processing of step S17 or S18 has been executed, the processing of step S19 is executed. In step S19, it is determined whether music replacement has been made or not. Music replacement is instructed by operating music select menu button 22 with the pointing device. When a piece of music different from currently selected one is selected by operating the menu button 22, the decision in step S19 is YES. Then, in step S20, the music information in the sequence information is rewritten. It should be noted that the other information in the sequence information is not changed at all. Thus, only the music information to be performed can be changed with ease.

When the processing of step S20 has come to an end or if the decision of step S19 is NO, then it is determined in step S21 whether recording of the information has been instructed or not. This information recording instruction determines whether various pieces of information have been edited by the user on the display screen shown in FIG. 5. The decision is YES if some edit processing has been executed by the user on the sequence information area. For example, the icon of a desired picture, effect, or scene change has been selected from the event area 26 and dragged to the picture area or the text area. Then, in step S22, the corresponding sequence information is recorded in correspondence with the contents of the sequence information display area 21.

When the processing of step S22 has come to an end or if the decision of step S21 is NO, then other edit processing is executed in step S23. This other processing includes trial reproduction of a scene or a scene change, and entering of a text into the text area. For example, when the user double-clicks the text area of a desired scene, a text input screen appears, through which the user can enter desired text data into that text area. The above-mentioned other edit processing also includes storing of edited or created sequence information. Thus, the user can create or edit sequence information with ease.

The computer readable medium M (FIG. 1) may be made for providing program instructions executable by the CPU 1 to perform the above described process of editing multimedia events including musical events and visual events arranged in synchronization to the musical events. The process comprises the steps of providing the sequence data structure composed of music information which can be processed to produce a progression of the musical events, image progression information which can be created to determine a sequence of the visual events, and event information which represents the visual events to be sequentially reproduced according to the image progression information, the sequence of the visual events being composed of a sub sequence of primary visual events representative of scenes and another sub sequence of secondary visual events representative of at least visual effects applied to the scenes and visual changes used to connect the scenes, providing a plurality of scenarios, each of which determines a sub sequence of secondary visual events, and allotting one of the scenarios to the music information when the image progression information is created such that the sub sequence of the secondary visual events determined by the allotted scenario is combined with the sub sequence of the primary visual events contained in the image progression information to constitute the sequence of the visual events.

The following describes the reproduction processing for reproducing the sequence information created or edited as described above. As described, the sequence information is reproduced by three types of interrupt processing.

Figure 8A:
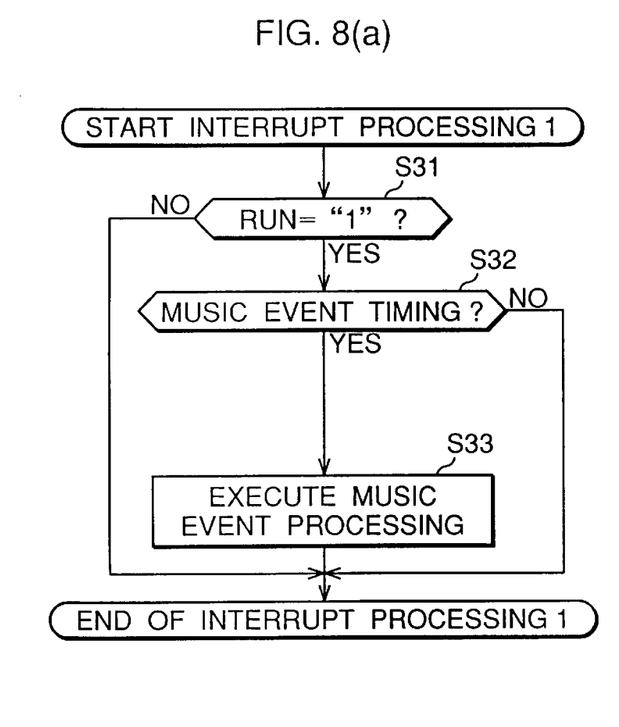
FIGS. 8(a) through 8(c) are flowcharts for illustrating multimedia information reproducing processing of the embodiment shown in FIG. 1.

FIG. 8(a) is a flowchart indicative of the operation of interrupt processing 1. The interrupt processing 1 reproduces music data to be specified by the music information in the reproduced sequence information. For example, this reproduction is executed with every clock timing of a clock pulse that is generated 24 times during one quarter note duration for example.

When the above-mentioned clock pulse is generated, the interrupt processing 1 (or performance interrupt processing) is triggered. First, in step S31, it is determined whether the RUN flag is set to "1" or not. If the RUN flag is set to "0", it indicates that no sequence information is reproduced (non-performance state), so that nothing is done and this interrupt processing immediately ends.

Figure 2A:
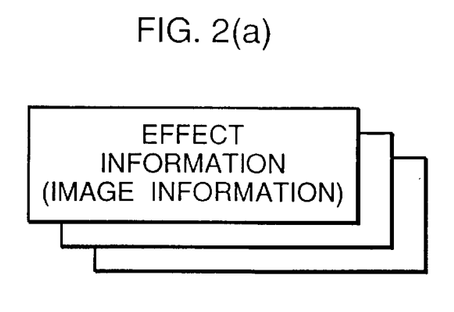
FIG. 2(a) through FIG. 2(e) are diagrams illustrating various data to be loaded in a random access memory of the embodiment shown in FIG. 1.
Figure 2B:
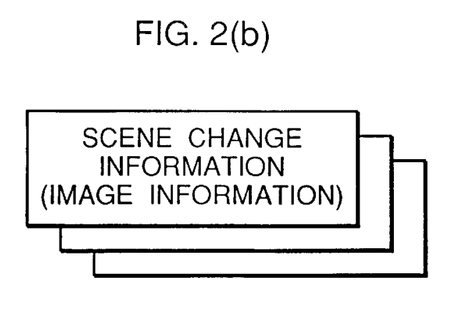
Figure 2C:
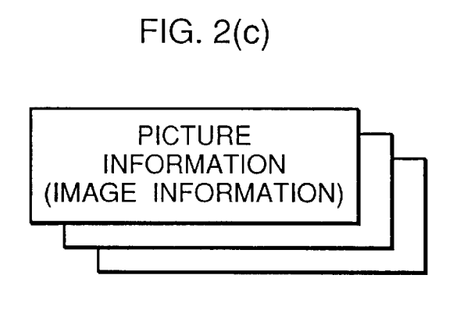
Figure 2D:
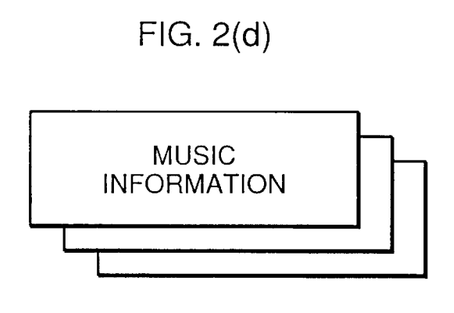
Figure 2E:
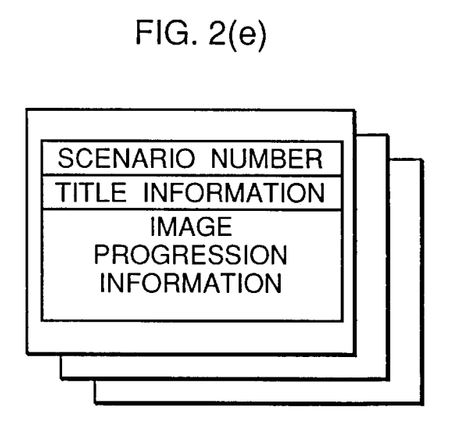

If the RUN flag is set to "1", the music data (refer to FIG. 2(d)) is referenced in step S32 to determine whether it is time when a music event associated with the MIDI data included in the music data is to be executed. If the event timing has not been reached, the interrupt processing 1 ends. If the event timing has been reached, that music event is processed in step S33. This music event processing is generally similar to that conducted in an ordinary tone generator. For example, a tone generator control parameter for the MIDI event in question is generated and the generated parameter is outputted to the tone generator 13 (FIG. 1).

Figure 8B:
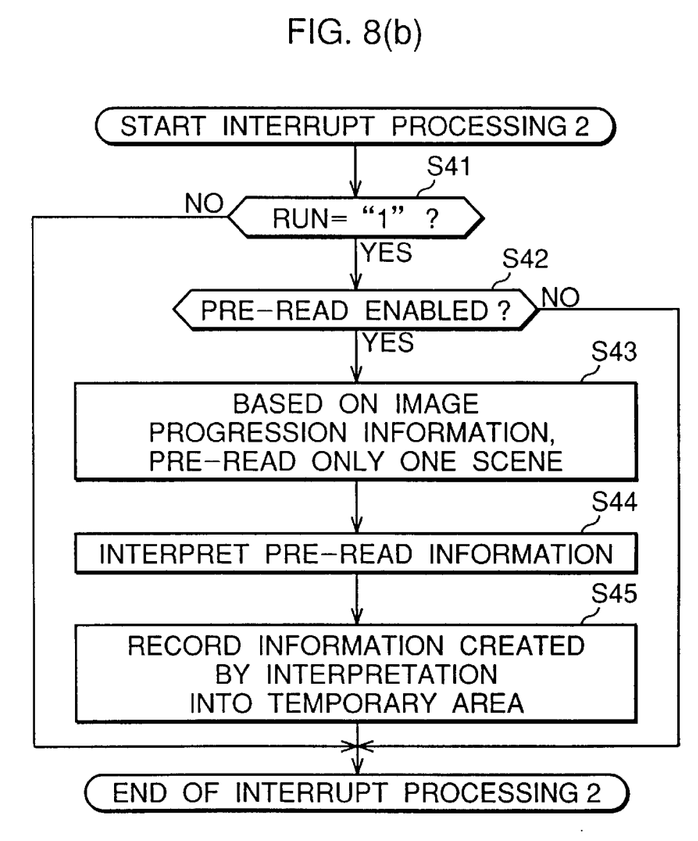

FIG. 8(b) is a flowchart for an interrupt processing 2 for reading in advance the image progression information included in the object sequence information to create image data to be displayed. The interrupt processing 2 (or pre-read interrupt processing) is executed in a shorter time interval than that of the interrupt processing 1, 72 times in one quarter note duration for example. When the interrupt processing 2 is triggered, it is determined in step S41 whether the RUN flag is "1" or not. If the RUN flag is "0", the interrupt processing 2 immediately ends without doing anything. If the RUN flag is "1", it is determined in step S42 whether the pre-read processing can be executed or not. For example, if the pre-read processing is found impracticable because there is no free temporary area, the decision is NO and the interrupt processing 2 ends.

If the decision is YES in step S42, then the image progression information in the sequence information to be reproduced is pre-read one by one scene. As described with reference to FIG. 3, the image progression information contains in pair the event timing data indicative of occurrence timing of each image event and the corresponding event property information, namely picture property information, effect property information, text property information, and scene change property information. The items of image event property information having the same event timing data are read as constituting one scene of the image progression information. Based on an event number included in the one scene of pre-read image information, the event information in the sequence information is referenced to read the corresponding event data based on event specification data.

Then, in step S44, the data such as the pre-read compressed picture data is decompressed, and then the display duration data, time resolution data, and setting information in the above-mentioned image property information are interpreted to create image information for each time resolution equivalent to the display duration namely, composite image information for each time resolution corresponding to the pre-read one scene of picture, effect, text, and scene change. In step S45, the created composite image information is stored in the temporary storage area in the occurrence order of the visual events. If no image information is stored in a recording area specified by the event specification data, this event specification data is handled as not existing from the beginning. For example, if an effect and a picture are specified and the information about the effect is not recorded, information based on the picture alone is created. Alternatively, image information resembling the specified image information may be used.

Figure 8C:
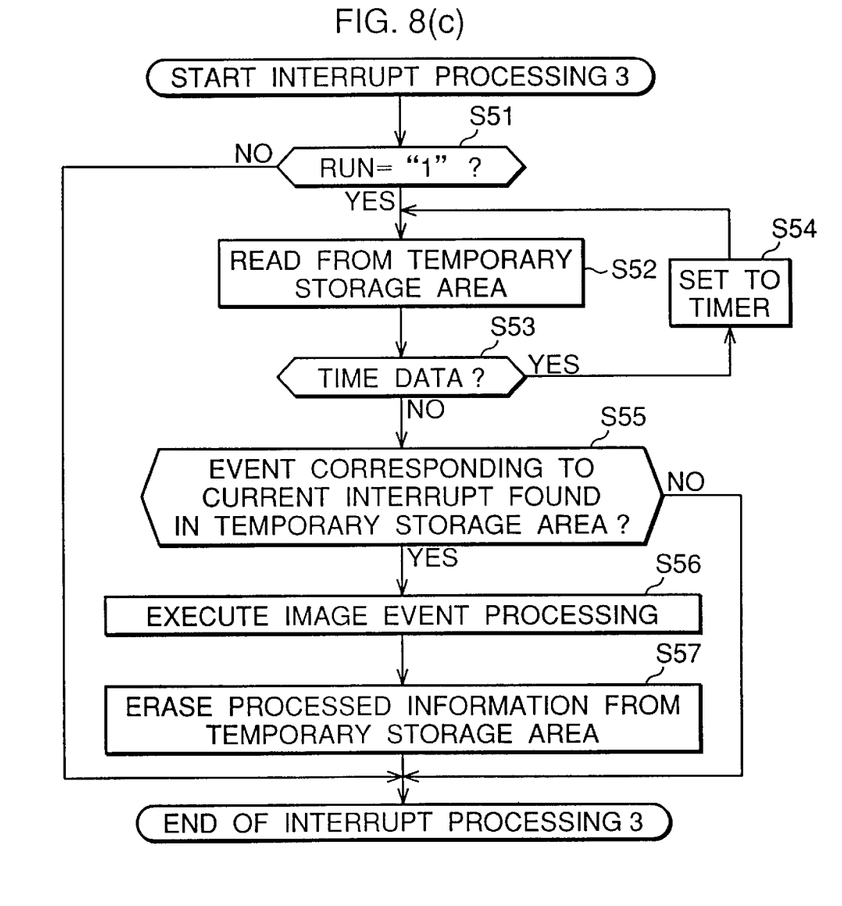

Further, based on the event timing data included in the image progression information and the time resolution data in the image property information, time information about the timing with which the composite image information is reproduced is determined and stored in the temporary storage area. Namely, the temporary storage area stores time data indicative of the interrupt timing of an interrupt processing 3 for each scene and image reproduction sequence data in the form of timing data plus event (a composite image) in this order.

FIG. 8(c) is a flowchart for the operations of the interrupt processing 3 for reading the image information (the image reproduction sequence data) created and recorded by the interrupt processing 2 into the temporary storage area in the RAM 3. The interrupt processing 3 (image interrupt processing) is executed in a cycle based on the time resolution set by the image progression information. When the interrupt processing 3 is executed, the execution cycle is varied according to whether the image to be reproduced is a still picture or moving picture, thereby speeding up the operation of the processing.

When a timer interrupt of a cycle based on the above-mentioned time resolution is caused, the interrupt processing 3 starts. First, in step S51, it is determined whether the RUN flag is "1" or not. If the RUN flag is "0", the interrupt processing 3 immediately ends. If the RUN flag is "1", data is read from the temporary storage area in step S52. Then, in step S53, it is determined whether the read data is the above-mentioned time data or not. If the decision is YES, the time data is set to the timer 4 to cause the interrupt processing 3 in step S54. This controls the interrupt timing of the third interrupt processing 3 based on the time data stored at a scene change position.

Then, data is read from the temporary storage area again. On the other hand, if the decision is NO in step S54, it is determined in step S55 whether an event (composite image information to be displayed) corresponding to the current interrupt timing is stored in the temporary storage area. If no corresponding event is found, the interrupt processing 3 ends. If the corresponding event is found, then in step S56, the image information stored in the temporary storage area is outputted to the display circuit 10 to execute image event processing. Then, in step S57, the processed information is erased 3 from the temporary storage area and the interrupt processing 3 ends. It should be noted that if the event in step S55 indicates performance end instruction data, the RUN flag is set to "0" in step S56, and sound muting processing and display terminate processing are executed.

In the above-mentioned embodiment, the interrupt timing of the interrupt processing 2 (pre-read interrupt processing) is associated with MIDI clock. It will be apparent that this interrupt timing may be based on any other time system. Further, at instructing sequence information reproduction start or at opening sequence information, the pre-read processing may be executed all over the image progression information to store all composite image data (image reproduction sequence data) into the temporary storage area before starting the reproducing operation. This allows the stable reproduction of the image information even if the CPU power is insufficient.

The interrupt processing 1 and the interrupt processing 3 may be executed as one interrupt processing while the above-mentioned image event processing cycle (the processing cycle of the interrupt processing 3) is set commonly to the music event processing cycle (MIDI clock timing).

Referring back again to FIG. 1, the inventive reproducing apparatus is constructed for reproducing multimedia events including musical events and visual events arranged in synchronization to the musical events. In the inventive reproducing apparatus, an information device such as the storage device 11 provides those of music information which determines a sequence of the musical events, image progression information which determines a sequence of the visual events in synchronization to the sequence of the musical events, and event information which represents the visual events involved in the image progression information. The tone generator 14 processes the music information to generate musical tones in correspondence to the sequence of the musical events. An image synthesizer device in the form of the display circuit 10 operates in synchronization to the tone generator 14 for sequentially processing the event information according to the image progression information to synthesize images in correspondence to the sequence of the visual events. The display device 9 displays the synthesized images along the progression of the musical tones to thereby reproduce the multimedia events. Preferably, the information device provides the music information and the image progression information, both of which adopt a common clock system for determining occurrence timings of the music events and the visual events in synchronization with each other. Preferably, the information device provides the image progression information containing data representing a time resolution of frames of the images corresponding to the sequence of the visual events, the image synthesizer device synthesizes the frames of the images according to the time resolution contained in the image progression information, and the display device 9 successively displays the frames of the images at a refresh rate corresponding to the time resolution.

In the above-mentioned embodiment, one picture and one visual effect are assigned in one scene as shown in FIG. 5. It will be apparent that more than one picture and one effect may be assigned. Further, in the above-mentioned example, the effect information, the scene change information, and the picture information are compressed. It will be apparent that these items of information need not always be compressed. The music information need not be MIDI data. The music data may be audio signals.

In the above-mentioned embodiment, the music information and the image progression information are stored separately in the sequence information. The music information and the image progression information may also be recorded in a form in which the music information representing music event data and the image progression information representing image event data are arranged together in time sequence. In the above-mentioned embodiment, the event information stores the event designation data for indirectly designating the recording area of each piece of image information (refer to FIG. 3(c)). Like the text information, the image information may be directly stored in the recording area. This variation increases the data mount of the sequence information over that of the above-mentioned embodiment. However, this variation allows the computer storing no image data designated by event designation data to reproduce the sequence information.

The scenario information may be recorded in the sequence information. In this variation, an old scenario and its current version may be related with other, thereby providing information that is useful in creating new image progression information. Further, the scenario information may be related with the music information. For example, each piece of music may be provided with two or more pieces of scenario information to make the setting information in the scenario information fit the corresponding music. This variation facilitates the creation of more effective image progression information for each music. Still further, information determining scene dividing positions may be included in the setting information. In the above-mentioned edit processing, scenario replacement or music replacement is executed by one operation totally. It will be apparent that the replacement may be partly executed in a predetermined range.

In the above-mentioned embodiment, a general-purpose personal computer is used to support the invention. It will be apparent that the above-mentioned various processing operations may be executed on an electronic musical instrument incorporating a tone generator and an automatic player or a plurality of devices interconnected through MIDI and a network.

Further, the computer readable medium M (FIG. 1) may be made for use in a personal computer having a central processor. The medium M contains program instructions executable by the central processor for causing the computer to perform a process of reproducing multimedia events including musical events and visual events arranged in synchronization to the musical events. The process comprises the steps of providing music information which determines a sequence of the musical events, image progression information which determines a sequence of the visual events in synchronization to the sequence of the musical events, and event information which represents the visual events involved in the image progression information, processing the music information to generate musical tones in correspondence to the sequence of the musical events, sequentially processing the event information according to the image progression information to synthesize images in correspondence to the sequence of the visual events, and displaying the synthesized images along the progression of the musical tones to thereby reproduce the multimedia events.

As described and according to the multimedia information editing and reproducing apparatus associated with the present invention, the sequence information determining image progression can be created in a form that follows the flow of music, and the created sequence information can be recorded in that form, thereby facilitating the creation of digital albums in video clip manner, for example. The present invention also facilitates the creation of image progression information having effective visual effects and scene flows. Further, the present invention can change, through a simple editing work, the atmospherics of image progression and the related music information while maintaining the substances of the images being created. Still further, the recording medium storing the sequence information according to the invention can reproduce image information in synchromization to the reproduction of musical tone signals.

While the preferred embodiment of the present invention has been described using specific terms, such description is for illustrative purposes only, and it is to be understood that changes and variations may be made without departing from the spirit or scope of the appended claims.

What is claimed is:

1. An apparatus for editing multimedia events including musical events and visual events arranged in synchronization to the musical events, the apparatus comprising:

a storage device that stores music information which can be processed to provide a progression of the musical events, image progression information which can be created to determine a sequence of the visual events, and visual event information which represents the visual events to be sequentially reproduced according to the image progression information, the sequence of the visual events being composed of a sub sequence of primary visual events representative of scenes and another sub sequence of secondary visual events representative of at least visual effects applied to the scenes and visual changes used to connect the scenes;

a helper device that provides a plurality of scenarios, each of which determines a sub sequence of secondary visual events; and a selector device operable when the image progression information is created for allotting one of the scenarios to the music information such that the sub sequence of the secondary visual events determined by the allotted scenario is combined with the sub sequence of the primary visual events contained in the image progression information to constitute the sequence of the visual events.

2. The apparatus according to claim 1, wherein the storage device stores the music information and the image progression information, both of which adopt a common clock system for determining occurrence timings of the music events and the visual events in synchronization with each other.

3. The apparatus according to claim 1, further comprising a device that can replace the music information of one song by new music information of another song while reserving the synchronization of the visual events to the musical events provided by the new music information.

4. The apparatus according to claim 1, wherein the helper device provides each scenario determining a title event, which is a specific one of the secondary visual events and which is arranged at a top portion of the sub sequence of the secondary visual events, such that the title event is automatically integrated into a head of the sequence of the visual events when the sub sequence of the secondary visual events is combined with the sub sequence of the primary visual events.

5. An apparatus for reproducing multimedia events including musical events and visual events arranged in synchronization to the musical events, the apparatus comprising:

an information device that provides music information which determines a sequence of the musical events, image progression information which determines a sequence of the visual events in synchronization to the sequence of the musical events, and event information which represents the visual events involved in the image progression information;

a tone generator device that processes the music information to generate musical tones in correspondence to the sequence of the musical events;

an image synthesizer device that operates in synchronization to the tone generator device for sequentially processing the event information according to the image progression information to synthesize images in correspondence to the sequence of the visual events; and a display device that displays the synthesized images along the progression of the musical tones to thereby reproduce the multimedia events.

6. The apparatus according to claim 5, wherein the information device provides the music information and the image progression information, both of which adopt a common clock system for determining occurrence timings of the music events and the visual events in synchronization with each other.

7. The apparatus according to claim 5, wherein the information device provides the image progression information containing data representing a time resolution of frames of the images corresponding to the sequence of the visual events, wherein the image synthesizer device synthesizes the frames of the images according to the time resolution contained in the image progression information, and the display device successively displays the frames of the images at a refresh rate corresponding to the time resolution.

8. A computer readable medium for storing a data structure processed by a computer to reproduce multimedia events including musical events and visual events arranged in synchronization to the musical events, wherein the data structure comprises:

music information that is arranged to determine a sequence of the musical events, and that is processed by the computer to generate musical tones in correspondence to the sequence of the musical events;

image progression information that is arranged to determine a sequence of the visual events in synchronization to the sequence of the musical events, the image progression information containing event timing data determining an occurrence timing of each visual event and event specification data specifying each visual event; and event information that directly or indirectly represents an image of each visual event, and that is sequentially processed by the computer according to the event specification data and the event timing data to synthesize images in correspondence to the sequence of the visual events along the progression of the musical tones.

9. A computer readable medium for use in a computer having a central processor, the medium containing program instructions executable by the central processor for causing the computer to perform a process of editing multimedia events including musical events and visual events arranged in synchronization to the musical events, wherein the process comprises the steps of:

providing music information which can be processed to produce a progression of the musical events, image progression information which can be created to determine a sequence of the visual events, and event information which represents the visual events to be sequentially reproduced according to the image progression information, the sequence of the visual events being composed of a sub sequence of primary visual events representative of scenes and another sub sequence of secondary visual events representative of at least visual effects applied to the scenes and visual changes used to connect the scenes;

providing a plurality of scenarios, each of which determines a sub sequence of secondary visual events; and allotting one of the scenarios to the music information when the image progression information is created such that the sub sequence of the secondary visual events determined by the allotted scenario is combined with the sub sequence of the primary visual events contained in the image progression information to constitute the sequence of the visual events.

10. A computer readable medium for use in a computer having a central processor, the medium containing program instructions executable by the central processor for causing the computer to perform a process of reproducing multimedia events including musical events and visual events arranged in synchronization to the musical events, wherein the process comprises the steps of:

providing music information which determines a sequence of the musical events, image progression information which determines a sequence of the visual events in synchronization to the sequence of the musical events, and event information which represents the visual events involved in the image progression information;

processing the music information to generate musical tones in correspondence to the sequence of the musical events;

sequentially processing the event information according to the image progression information to synthesize images in correspondence to the sequence of the visual events; and displaying the synthesized images along the progression of the musical tones to thereby reproduce the multimedia events.

11. A method of editing multimedia events including musical events and visual events arranged in synchronization to the musical events, the method comprising the steps of:

providing music information which can be processed to produce a progression of the musical events, image progression information which can be created to determine a sequence of the visual events, and event information which represents the visual events to be sequentially reproduced according to the image progression information, the sequence of the visual events being composed of a sub sequence of primary visual events representative of scenes and another sub sequence of secondary visual events representative of at least visual effects applied to the scenes and visual changes used to connect the scenes;

providing a plurality of scenarios, each of which determines a sub sequence of secondary visual events; and allotting one of the scenarios to the music information when the image progression information is created such that the sub sequence of the secondary visual events determined by the allotted scenario is combined with the sub sequence of the primary visual events contained in the image progression information to constitute the sequence of the visual events.

12. A method of reproducing multimedia events including musical events and visual events arranged in synchronization to the musical events, the method comprising the steps of:

providing music information which determines a sequence of the musical events, image progression information which determines a sequence of the visual events in synchronization to the sequence of the musical events, and event information which represents the visual events involved in the image progression information;

processing the music information to generate musical tones in correspondence to the sequence of the musical events;

sequentially processing the event information according to the image progression information to synthesize images in correspondence to the sequence of the visual events; and displaying the synthesized images along the progression of the musical tones to thereby reproduce the multimedia events.

13. An apparatus for editing multimedia events including musical events and visual events arranged in synchronization to the musical events, comprising:

means for providing a data structure composed of music information which can be processed to produce a progression of the musical events, image progression information which can be created to determine a sequence of the visual events, and event information which represents substances of the visual events to be sequentially reproduced according to the image progression information, the sequence of the visual events being composed of a sub sequence of primary visual events representative of scenes and another sub sequence of secondary visual events representative of at least visual effects applied to the scenes and visual changes used to connect the scenes;

means for providing a plurality of scenarios, each of which determines a sub sequence of secondary visual events; and means for allotting one of the scenarios to the music information when the image progression information is created such that the sub sequence of the secondary visual events determined by the allotted scenario is combined with the sub sequence of the primary visual events contained in the image progression information to constitute the sequence of the visual events.

14. An apparatus for reproducing multimedia events including musical events and visual events arranged in synchronization to the musical events, comprising:

means for providing a data structure composed of music information which determines a sequence of the musical events, image progression information which determines a sequence of the visual events in synchronization to the sequence of the musical events, and event information which represents images of the visual events involved in the image progression information;

means for processing the music information to generate musical tones in correspondence to the sequence of the musical events;

means for sequentially processing the event information according to the image progression information to synthesize the images in correspondence to the sequence of the visual events; and means for displaying the synthesized images along the progression of the musical tones to thereby reproduce the multimedia events.

* * * * *